(12) United States Patent  
Williamson et al.

(10) Patent No.: US 12,534,040 B2  
(45) Date of Patent: Jan. 27, 2026

(54) AIRBAG, PREFERABLY OPW AIRBAG, FOR A VEHICLE

(71) Applicant: Global Safety Textiles GmbH, Bad Säckingen (DE)

(72) Inventors: David Williamson, Lörrach (DE); Daniel Albiez, Murg (DE)

(73) Assignee: GLOBAL SAFETY TEXTILES GMBH, Bad Säckingen (DE)

( * ) Notice: Subject to any disclaimer, the term of this patent is extended or adjusted under 35 U.S.C. 154(b) by 0 days.

(21) Appl. No.: 18/948,699

(22) Filed: Nov. 15, 2024

(65) Prior Publication Data  
US 2025/0170982 A1    May 29, 2025

(30) Foreign Application Priority Data

Nov. 24, 2023   (DE) .................. 10 2023 132 907.3

(51) Int. Cl.
*B60R 21/235* (2006.01)
*B60R 21/233* (2006.01)
*B60R 21/2338* (2011.01)

(52) U.S. Cl.
CPC .......... *B60R 21/235* (2013.01); *B60R 21/233* (2013.01); *B60R 21/2338* (2013.01); *B60R 2021/23386* (2013.01); *B60R 2021/23509* (2013.01); *B60R 2021/23538* (2013.01); *B60R 2021/23547* (2013.01)

(58) Field of Classification Search
CPC .......... B60R 2021/23308; B60R 2021/23386; B60R 2021/23509; B60R 2021/23538; B60R 2021/23576; B60R 2021/23547; B60R 21/203; B60R 21/233; B60R 21/2338; B60R 21/235

See application file for complete search history.

(56) References Cited

U.S. PATENT DOCUMENTS 7,108,282 B2 *   9/2006   Hasebe ................. B60R 21/237  
                                                    280/743.1  
7,137,647 B2 *   11/2006   Adomeit ............... B60R 21/231  
                                                    280/743.1

(Continued)

FOREIGN PATENT DOCUMENTS

DE   102019002441 A1   10/2020  
DE   102020108400 A1   8/2021  
JP   2007145098 A  *  6/2007 ............. B60R 22/02

*Primary Examiner* — Laura Freedman  
(74) *Attorney, Agent, or Firm* — Chrisman Gallo Tochtrop LLC

(57) ABSTRACT

An airbag has at least two fabric layers which are connected to one another in such a way that a central inflow region forming a first airbag chamber and at least two wing regions forming respective second airbag chambers and extending radially from the inflow region are formed. During the inflation operation of the airbag, a gas flows first into the central inflow region and then from the central inflow region into the respective wing regions. Distal end portions of the at least two wing regions are connected to one another via a flat tensioning element, so that the distal end portions move axially away from the central inflow region during the inflation operation of the airbag and, in the inflated state of the airbag, radially tension the flat tensioning element at an axial distance from the central inflow region.

11 Claims, 6 Drawing Sheets

(56) References Cited

U.S. PATENT DOCUMENTS

| | | | | |
|---|---|---|---|---|
| 7,195,275 B2* | 3/2007 | Abe | ............... | B60R 21/231 |
| | | | | 280/743.2 |
| 7,360,790 B2* | 4/2008 | Hasebe | ............... | B60R 21/2338 |
| | | | | 280/743.2 |
| 7,631,895 B2* | 12/2009 | Kalliske | ............... | B60R 21/233 |
| | | | | 280/743.2 |
| 7,891,705 B2* | 2/2011 | Dennis | ............... | B60R 21/233 |
| | | | | 280/743.1 |
| 8,403,358 B2* | 3/2013 | Choi | ............... | B60R 21/214 |
| | | | | 280/743.2 |
| 9,296,359 B2* | 3/2016 | Pan | ............... | B60R 21/23 |
| 9,573,555 B2* | 2/2017 | Jang | ............... | B60R 21/2338 |
| 9,676,355 B2 | 6/2017 | Kruse | | |
| 9,738,243 B2* | 8/2017 | Fukawatase | ............... | B60R 21/2338 |
| 9,845,067 B2* | 12/2017 | Morris | ............... | B60R 21/233 |
| 10,065,592 B2* | 9/2018 | Jaradi | ............... | B60R 21/214 |
| 10,183,645 B2* | 1/2019 | Rose | ............... | B60R 21/01552 |
| 10,343,641 B2* | 7/2019 | Abramoski | ............... | B60R 21/233 |
| 10,654,439 B2* | 5/2020 | Kitagawa | ............... | B60R 21/237 |
| 11,007,969 B2* | 5/2021 | Albiez | ............... | D03D 11/02 |
| 11,220,230 B1* | 1/2022 | Faruque | ............... | B60R 21/203 |
| 11,618,982 B2* | 4/2023 | Albiez | ............... | D03D 11/00 |
| | | | | 139/389 |
| 11,766,987 B2 | 9/2023 | Albiez | | |
| 11,866,857 B2 | 1/2024 | Albiez et al. | | |
| 11,975,672 B2* | 5/2024 | Oh | ............... | B60R 21/233 |
| 12,311,866 B1* | 5/2025 | Zhang | ............... | B60R 21/205 |
| 2018/0361978 A1* | 12/2018 | Belwafa | ............... | B60R 21/233 |

* cited by examiner

Section A - A

Section B - B a)

b)

AIRBAG, PREFERABLY OPW AIRBAG, FOR A VEHICLE

CROSS-REFERENCE TO RELATED APPLICATIONS

This application claims the benefit of priority to German Application No. 10 2023 132 907.3, filed Nov. 24, 2023, the entire disclosures of which are hereby incorporated herein by reference.

BACKGROUND

The invention relates to an airbag, preferably an OPW airbag, which is configured to be set from an uninflated state, for example a folded or collapsed state, to an inflated state, for example an unfolded state, in which the airbag can achieve its protective effect, for the protection of an occupant of a vehicle such as a motor vehicle or commercial vehicle by means of an inflation operation.

Such airbags used in vehicles can be manufactured in different ways and are referred to as OPW airbags, Cut & Sew airbags or Cut, Seal & Sew airbags, for example, depending on the method of manufacture.

OPW airbags, so-called one-piece woven airbags, are airbags or airbags woven from one piece, while Cut & Sew airbags or Cut, Seal & Sew airbags are obtained by cutting several pieces of fabric, which may be glued and then sewn together.

Such airbags are widely used as part of vehicle restraint systems to protect vehicle occupants from collision with components of a vehicle structure such as a steering wheel, dashboard, door frame, etc.

Restraint systems in the form of airbag systems with such OPW airbags or airbags or with conventional airbags manufactured using the Cut & Sew or Cut, Seal & Sew process are actively activated if necessary and are widely known as active restraint systems in vehicles such as motor vehicles.

Airbags are designed differently depending on the type and location of use. Various types of airbags are known from the state of the art, for example in the form of driver and front passenger airbags, side airbags, far-side airbags, head airbags, knee airbags, window airbags, etc. The so-called far-side airbags, also known as front-center airbags, are located in the driver's seat of motor vehicles on the side facing the front passenger, for example.

Driver or front passenger airbags, which are used for frontal impact protection, are usually installed on the vehicle's steering wheel in front of the driver or behind the instrument panel for the other occupants (front passenger) in the front seats. In addition to frontal impact protection, airbags are also used to protect against side impacts. For example, the aforementioned side airbags, such as curtain airbags, side airbags in the seat or in the door trim, etc., are also provided. In particular, curtain airbags or special side airbags are thus generally fitted along roof side rails, i.e. the roof structure of the vehicle body, and deploy there to form an energy-absorbing structure between the head and upper torso of an occupant and the interior components of the vehicle.

In the event of an accident or imminent accident, a sensor fitted to the vehicle measures an abnormal deceleration of the vehicle. For example, gas is supplied to the airbag within a few milliseconds to set it from an uninflated state, i.e. folded or collapsed state, to an inflated state during an inflation operation. This is accomplished by a device such as a gas generator, commonly referred to as an "inflator". The inflated airbag cushions the vehicle occupant from the impact forces.

In addition to the aforementioned OPW method, airbags are also often manufactured in a somewhat more complex way using the aforementioned Cut & Sew method or Cut, Seal & Sew method.

In particular, the Cut & Sew method only involves cutting pieces of fabric forming fabric layers to the desired shape, placing them on top of each other and sewing them together to form the airbag, the so-called Cut & Sew airbag.

Known airbags manufactured using the Cut, Seal & Sew method for this purpose are complex solutions and are produced with a high degree of manufacturing effort, for example by cutting out two or more identical or partially identical or different production parts from a flat fabric coated with silicone, spraying a sealing compound onto the edges—e.g. in the form of a circumferential bead—and then placing the two or more fabric parts on top of each other and then bonding the parts together. In addition, the fabric layers formed in this way are provided with a seam to ensure sufficient strength of the adhesive seam.

In the case of airbags manufactured using the Cut & Sew method and airbags manufactured using the Cut, Seal & Sew method, additional components, e.g. catch straps, flaps etc., sometimes also have to be sewn on in a further process step for shaping (with or without sealant).

The Cut & Sew process and the Cut, Seal & Sew process can therefore be more time-consuming and/or cost-intensive than the OPW process and often require numerous manual process steps.

In order to increase the protective effect of airbags or airbags, an approach is taken, for example, when designing airbags, especially in the region of frontal protection (such as driver airbags, passenger airbags), to design the airbags with a greater airbag depth and with a larger contact surface or impact surface into which an occupant is impacted in the event of a collision. Up to now, it is known from the state of the art that the airbags are balloon-shaped, but this requires a higher airbag volume. However, larger airbag volumes require larger gas generators and therefore inevitably more installation space in the vehicle, which is contrary to the design specifications for the airbag design.

The ever-increasing demands on airbags and airbags, especially in the area of frontal protection in connection with the driver airbag or driver airbag, require not only an increasing depth in airbags or airbags, i.e. an increasing distance between the front surface or impact surface of the inflated airbag and the steering wheel, but at the same time the largest possible impact surface or contact surface as the front surface of the airbag.

According to the prior art, increased depths of the airbag are only achieved in conjunction with increased airbag or airbag volume, whereby the aforementioned balloon-shaped airbag designs are primarily used for this purpose. The balloon-shaped airbag design offers the advantage that a large contact surface or impact surface can be realized as the front surface of the airbag, whereby the airbag volume that can be filled with gas can be kept low, at least to some extent, due to the tapered shape of the airbag in the direction of the steering wheel.

As already mentioned, larger airbag or airbag volumes also require larger gas generators and inevitably more installation space in the vehicle, which is generally a problem under conventional installation space requirements, as ever smaller installation spaces are required for airbags.

Due to their design, the contact surface or impact surface of conventional driver airbags or driver airbags is often convex, i.e. curved outwards. This is particularly disadvantageous in that in the event of a frontal or side impact accident, the occupant can hit an edge area of the contact surface and slide over it, resulting in a reduced protective effect from the airbag or airbag.

SUMMARY

It is therefore an object of the invention to provide an airbag, preferably an OPW airbag, with which the disadvantages known from the prior art can be at least partially avoided or at least reduced; preferably, the invention is intended to provide an airbag which can nevertheless achieve an increased protective effect for the occupant with a low airbag volume, preferably can provide a contact or impact surface offering a better protective effect with a lower airbag filling volume.

This object is solved by an airbag with the features of claim 1. Further advantageous embodiments and modifications of the invention are apparent from the dependent claims.

The airbag according to the invention is preferably a woven OPW airbag which is configured to be moved from an uninflated state, for example a folded or collapsed state, to an inflated or deployed state in which the airbag can achieve its protective effect for the occupant, by means of an inflation operation, for example by means of a gas generator, in order to protect an occupant of a vehicle. The airbag according to the invention has at least two fabric layers, preferably two or three fabric layers in certain regions and/or three fabric layers in certain regions, which are connected to one another in such a way that a central inflow region forming a first airbag chamber and at least two wing regions extending away from the inflow region or extending radially, forming respective second airbag chambers are formed, so that during the inflation operation of the airbag a gas can first flow into the central inflow region and then from the central inflow region into the respective wing regions, wherein distal end portions of the at least two wing regions are connected to one another via a flat, for example circular or square, tensioning element, so that the distal end portions move away from the inflow region in the depth direction of the airbag during the inflation operation of the airbag or move axially away from the central inflow region and stretch or radially tension the flat tensioning element in the depth direction away from the inflow region or axially spaced from the central inflow region in the inflated state of the airbag.

Preferably, the airbag or gas bag/airbag according to the invention is designed as a three-layer OPW airbag at least in the regions in which the airbag is to have a particularly high rigidity and stability, for example in the wing regions forming the second airbag chambers in the inflated state, in order to be able to stretch the tensioning element. The contact or impact surface, which is intended to protect the occupant in the event of an impact, is at least partially formed by the tensioning element, which is stretched by means of the wing regions and is, for example, a flat fabric piece or a nonwoven fabric blank. The tensioning element held or stretched in this way can, together with the respective distal end portions of the respective wing regions, form a contact or impact surface, which runs flat or concave, i.e. curved inwards or bent inward, in relation to the external appearance of the airbag, by corresponding design of the respective wing regions and by corresponding determination of the attachment location of the tensioning element at the respective distal end portions. The concave shape of the airbag in the contact area, which is formed by the respective distal end portions of the wing regions and the tensioning element, in combination with the very rigid and stable inflated OPW airbag outer construction, reduces cases in which the occupant could slip past the edge of the airbag. The airbag according to the invention also allows a larger protective volume to be realized without increasing the inflation or filling volume of the airbag.

The flat or spread-out OPW blank or the part of the OPW airbag forming the first airbag chamber and the second airbag chambers has several wing regions which bend axially and radially outwards when the airbag is inflated, thereby assuming a bowl-like shape. By attaching, for example sewing on, the tensioning element, for example in the form of a flat fabric blank, which is smaller, for example in the radial direction, than a distance between opposite outer edges of the wing regions in the inflated state of the OPW airbag, the entire airbag is placed under tension and is supported by the adjacent tubular stiffening chambers formed in the second airbag chambers in the respective wing regions. This results in an extremely stable construction, especially when neighboring wing regions are also supported against each other in the inflated state.

Due to the fact that the airbag according to the invention forms a contact or impact surface in the inflated state, which is formed by sections of the wing regions and the tensioning element, i.e. the tensioning element in the form of the flat fabric piece is held in the corresponding position under tension, the direct impact into the airbag does not take place in an air chamber filled with upper pressure, as is usually the case, but for the most part in the flat fabric piece held under tension.

Furthermore, the airbag according to the invention can be further formed in such a way that the fabric layers, preferably three fabric layers, are linked to one another in the wing regions in such a way that, during the inflation operation of the airbag, their distal end portions stretch or radially tension the flat tensioning element, for example in the form of a flat fabric piece, at a distance from the central inflow region, which preferably has two or three fabric layers, in a position of the at least two wing regions which is determined by a tensioning/stretching force of the flat tensioning element. The inflation behavior of the airbag can thus be at least partially controlled by the appropriate design and configuration of the tensioning element and preferably the end position of the inflated wing regions can be predetermined when the inflation operation is complete.

Furthermore, the airbag according to the invention can be realized in such a way that the fabric layers in the wing regions are linked to one another in such a way that the at least two wing regions curve outwards in a radial direction at least in portions during the inflation operation of the airbag and/or the at least two wing regions extend axially from the central inflow region in the inflated state of the airbag and are bent radially outwards at least in portions. This can be achieved, for example, by the wing regions being designed in three layers and a corresponding arrangement of stiffening chambers or a corresponding stiffening chamber structure being formed by the three fabric layers, which cause the outward curvature or bending during the inflation operation. For example, the stiffening chambers can be designed as elongated stiffening chambers, which are each arranged radially offset to one another along a respective wing region and each extend in the circumferential direction.

Furthermore, the airbag according to the invention can be implemented in such a way that the airbag has three fabric layers, namely a first fabric layer, a second fabric layer and a third fabric layer, at least in the wing regions, the second fabric layer being arranged between the first fabric layer and the third fabric layer. Preferably, the first fabric layer is a lower fabric layer or a fabric layer forming an outer shell of the inflated airbag, the second fabric layer is a middle fabric layer running inside the airbag, and the third fabric layer is an upper fabric layer or a fabric layer forming an inner shell of the airbag. Three fabric layers are woven together in such a way that stiffening chambers extending in the circumferential direction and radially offset to one another are formed between the first fabric layer and the second fabric layer, i.e. lower or outer stiffening chambers, and between the third fabric layer and the second fabric layer, i.e. upper or inner stiffening chambers, which during their inflation operation cause the wing regions to be curved outwards at least in portions when the airbag is viewed from the surroundings. Based on the arrangement, dimensioning (stiffening chamber volume, diameter) and their respective offset in the circumferential direction of the respective upper/inner and lower/outer stiffening chambers, the outward curvature can be affected.

Moreover, the airbag according to the invention can be designed in such a way that the airbag is formed as a woven OPW airbag with warp threads and weft threads which are woven into the woven fabric layers in the central, preferably two-layer, inflow region and the respective, preferably three-layer, wing regions, the warp threads and weft threads being woven together in such a way that the airbag forms the central inflow region in two layers and the respective wing regions in three layers, wherein in a first partial region between a respective wing region and a second partial region, which extends towards the inflow region and finally forms the latter, the warp and weft threads of the middle or second fabric emerge from the middle or second fabric layer and float completely between the lower or first fabric layer and the upper or third fabric layer and are incorporated in the lower or first fabric layer or in the upper or third fabric layer in the second partial region. The first partial region thus forms a transition region in which the second or middle fabric layer dissolves and the warp and weft threads of this middle fabric layer float completely until they reach the second partial region, in which the warp and weft threads are then incorporated into the lower or upper fabric layer. In the second partial region, the lower and upper fabric layers thus have parts of the middle fabric layer.

Furthermore, the airbag according to the invention can be designed in such a way that adjacent wing regions are connected to each other in circumferential direction at least in portions, preferably connected or sewn together via seam portions. There are also exposed, unconnected or unsewn side sections of adjacent wing regions, between which there is a gap. Adjacent wing regions can thus support each other at least in portions when the airbag is in the inflated state.

Furthermore, the airbag according to the invention can be designed in such a way that the airbag is circular when viewed in the axial direction in the inflated state and/or the wing regions are segmental circular when viewed in the axial direction in the inflated state of the airbag.

Furthermore, the airbag according to the invention can be realized in such a way that the at least two fabric layers, preferably two or three fabric layers in the central inflow region and three fabric layers in the respective wing regions, form a circular or star-shaped contour of the airbag when lying on top of each other.

Furthermore, the airbag according to the invention can be implemented in such a way that, in the inflated state, the airbag has the shape of a paraboloid, in particular a rotational paraboloid or elliptical paraboloid or a bowl.

Moreover, the airbag according to the invention can be realized in such a way that the airbag in the inflated state is designed in such a way that the inflow region, the wing regions and the flat tensioning element surround a space outside the inflated airbag, at least in portions. This means that when inflated, the airbag surrounds a space or cavity in which atmospheric pressure prevails or at least a different pressure compared to the pressure prevailing inside the airbag. Accordingly, the parts or sections of the airbag forming the airbag chambers together with the tensioning element enclose the cavity outside the airbag, in which atmospheric pressure preferably prevails and which therefore does not have to be filled with air due to the design of the airbag. This in turn leads to a smaller filling volume of the airbag while still maintaining a large protective volume (outer shell of the airbag in the inflated state), as the airbag only surrounds the cavity itself with its stable and rigid chamber structure.

In addition, the airbag according to the invention can be further designed in such a way that the airbag forms a flat or concave shape in the region of the distal end portions and the flat tensioning element. Depending on the points of the distal end portions to which the flat tensioning element is attached, i.e. further in the radial direction towards the inflow region or towards the edge of the wing regions, the airbag can have a flat or concave shape as a contact surface or impact surface.

BRIEF DESCRIPTION OF THE DRAWINGS

A preferred embodiment of the invention is explained below by way of example with reference to the figures.

These show.

DESCRIPTION OF EMBODIMENTS

In the embodiments shown in FIGS. 1 to 5, the airbag or gas bag 10 according to the invention is manufactured as an OPW airbag, i.e. it is a so-called "one piece woven" airbag 10, i.e. an airbag 10 woven in one piece.

In the specific case of application, the airbag 10 in this embodiment example is designed as a steering wheel airbag and is accordingly provided on a steering wheel not shown in detail here in a conventional manner not described in detail here.

The airbag 10 according to the invention is configured to be moved from an uninflated state, such as a folded or collapsed state, to an inflated or deployed state, in which the airbag can achieve its protective effect for the occupant, for the protection of an occupant of a vehicle such as a motor vehicle or commercial vehicle, in a conventional manner by means of an inflation operation, for example by means of a conventional gas generator which is not further specified here. That is, the airbag 10 is deployed from the uninflated state to the inflated state in a conventional manner in response to activation of an inflation device such as a gas generator, which is activated, for example, when a vehicle collision or the like is detected.

Figure 1:
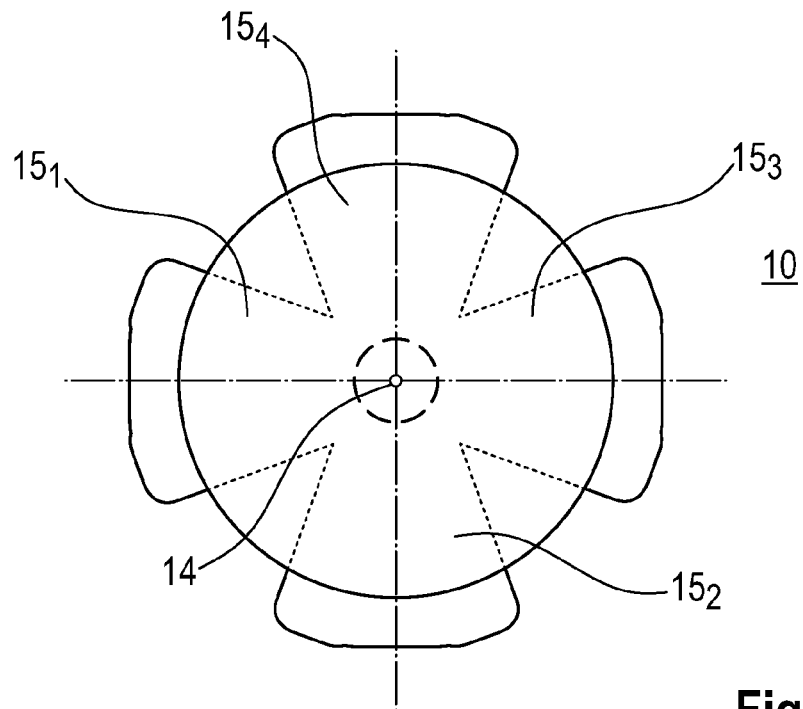
FIG. 1 is a schematic diagram of an airbag according to the invention in the deployed state in a view from above.
Figure 2:
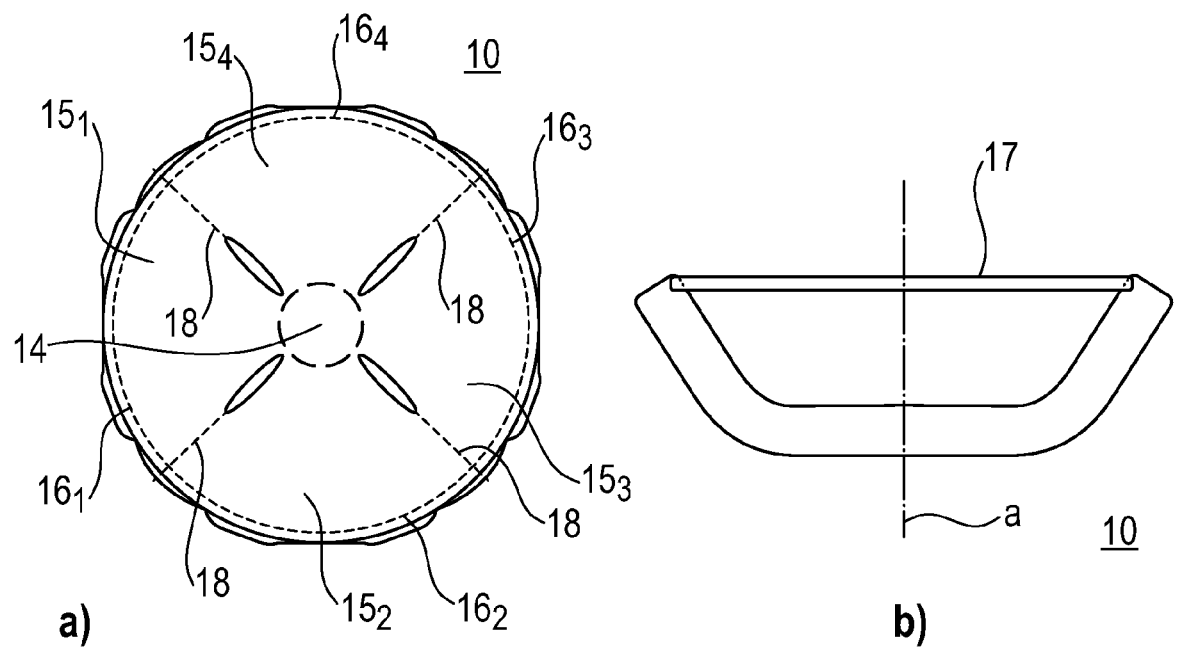
FIG. 2*a* is schematic diagram of the airbag according to the invention of FIG. 1 in the inflated state in a view from above.
FIG. 2*b* is a schematic cross-sectional diagram of the airbag according to the invention of FIG. 1 in the inflated state.

The airbag 10 according to the invention is shown in more detail in FIGS. 1 and 2. FIG. 1 shows a schematic representation of the airbag 10 according to the invention in the deployed state in a view from above, in which a tensioning element 17 described in more detail below still rests loosely on the parts forming the airbag chambers of the airbag 10, i.e. is not yet attached thereto. On the other hand, FIG. 2a shows a schematic representation of the airbag 10 according to the invention in the inflated state with tensioning element 17 attached in a view from above and FIG. 2b shows a schematic representation of the airbag 10 according to the invention with tensioning element 17 attached in the inflated state in a cross-sectional view.

As can be seen in principle in FIGS. 1 and 2, the airbag 10 has a plurality of fabric layers 11, 12, 13, which are described in more detail below and are connected to one another in such a way that a central inflow region 14 forming a first airbag chamber and, in this case, four wing regions $15_1$, $15_2$, $15_3$, $15_4$ (all designated 15 for short) extending away from the inflow region 14, in this case extending radially away and forming respective second airbag chambers, are formed.

These areas 14 and 15 thus form the part of the airbag forming the airbag chambers. Accordingly, during the inflation operation of the airbag 10, a gas can first flow into the central inflow region 14 and then from the central inflow region 14 into the respective wing regions $15_1$, $15_2$, $15_3$, $15_4$. For example, a section of the inflow region 14 is designed as a generator mouth to accommodate a gas generator for filling the airbag 10 or as a connection region for connecting a generator. The generator is mounted and connected in the conventional way and is therefore not described in detail.

The respective wing regions $15_1$, $15_2$, $15_3$, $15_4$ in turn have respective distal end portions $16_1$, $16_2$, $16_3$, $16_4$, which are connected to one another via a flat tensioning element 17. In particular, a respective distal end portion $16_1$, $16_2$, $16_3$, $16_4$ may be an outermost edge region of the respective wing region $15_1$, $15_2$, $15_3$, $15_4$. Alternatively, however, a respective distal end portion $16_1$, $16_2$, $16_3$, $16_4$ may also be a portion offset further inwards or further radially inwards by a predetermined distance from the outermost edge region of the respective wing region $15_1$, $15_2$, $15_3$, $15_4$.

The distal end portions $16_1$, $16_2$, $16_3$, $16_4$ are in any case each connected directly to the tensioning element 17 and indirectly to one another via the tensioning element 17.

This causes the distal end portions $16_1$, $16_2$, $16_3$, $16_4$ to move in the depth direction of the airbag or axially away from the central inflow region 14 during the inflation operation of the airbag 10 and, in the inflated state of the airbag 10, to stretch the flat tensioning element 17 at an axial distance from the central inflow region 14, in this case radially, as can be seen in particular in FIG. 2b).

In particular, the fabric layers 11, 12, 13 in the wing regions $15_1$, $15_2$, $15_3$, $15_4$, which are described in more detail below, are linked to one another in such a way that the distal end portions $16_1$, $16_2$, $16_3$, $16_4$ of the wing regions $15_1$, $15_2$, $15_3$, $15_4$, during the inflation operation of the airbag 10, stretch or radially tension the tensioning element 17, for example in the form of a flat fabric piece or a nonwoven fabric blank, at a distance or away from the central inflow region 14 in a position of the four wing regions $15_1$, $15_2$, $15_3$, $15_4$ which is determined by an expansion capacity and/or a stretching force of the flat tensioning element 17 and the rigid and stable structure of the respective wing regions $15_1$, $15_2$, $15_3$, $15_4$, as shown by way of example in FIG. 2b).

As can also be seen in FIG. 2b) in particular, the fabric layers 11, 12, 13 are linked together in the wing regions $15_1$, $15_2$, $15_3$, $15_4$ in such a way that the four wing regions $15_1$, $15_2$, $15_3$, $15_4$ curve outwards in a radial direction at least in portions during the inflation operation of the airbag 10 and extend axially away from the central inflow region 14 when the airbag 10 is in the inflated state. Together with the inflow region 14, they thus form an outer shell and inner shell of the part of the airbag chamber 10 forming the airbag chambers.

Furthermore, adjacent wing regions $15_1$, $15_2$, $15_3$, $15_4$ are connected to each other in portions in the circumferential direction, namely via seam portions 18, which are sewn together, for example. As a result, respective gaps are formed between the wing regions in the radial direction between the seam portions 18 and the inflow region 14, in which the adjacent wing regions $15_1$, $15_2$, $15_3$, $15_4$ are not connected to one another.

As a result, the airbag 10 takes on the shape of a paraboloid, in particular a rotational paraboloid or elliptical paraboloid or a bowl, in the inflated state. In the inflated state, the airbag 10 is shaped such that the inflow region 14, the wing regions $15_1$, $15_2$, $15_3$, $15_4$ and the flat tensioning element 17 surround, at least in portions, a space or cavity outside the inflated airbag 10, this cavity thus not representing an inflation volume of the airbag, i.e. not being a space that can be filled with gas or air during the inflation operation. Rather, the cavity is at atmospheric pressure or at least at a different pressure from the filled airbag 10.

Thus, the airbag 10 is circular when viewed in the axial direction when in the inflated state, the wing regions $15_1$, $15_2$, $15_3$, $15_4$ being segmental circular when viewed in the axial direction when the airbag 10 is in the inflated state.

Figure 3:
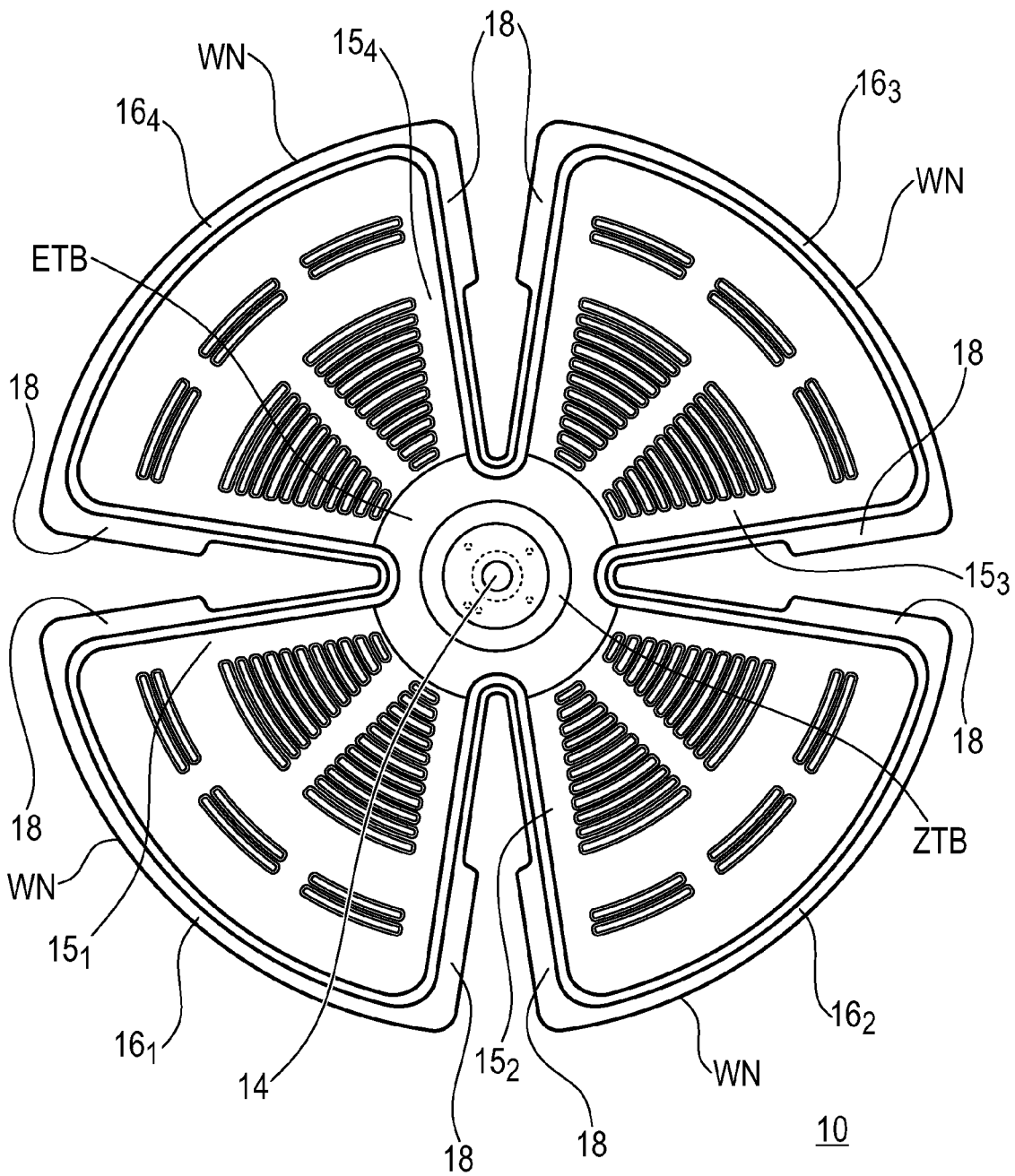
FIG. 3 is a schematic diagram of a part of the airbag according to the invention of FIG. 1 in the deployed state in a view from above.

FIG. 3 shows a schematic representation of a part of the airbag 10 according to the invention of FIG. 1, namely only the part of the airbag 10 forming the airbag chamber and inflow region, in the deployed state in a view from above, i.e. a representation of the airbag 10 as such without the tensioning element 17 and without interconnected seam portions 18.

As can be seen, the fabric layers 11, 12, 13 which are explained in more detail below, form a circular or star-shaped contour of the airbag when they are on top of each other or when the airbag 10 is laid out. A surrounding woven seam WN is formed in the edge area of the part of the airbag 10 thus laid out or spread out to form airbag chambers, in which the two or three fabric layers 11, 12, 13 converge or are woven together to form a seam. The specific structure of the airbag 10 or the part of the airbag 10 forming the airbag chambers is now described below in conjunction with FIGS. 4a) to 4c).

Figure 4A:
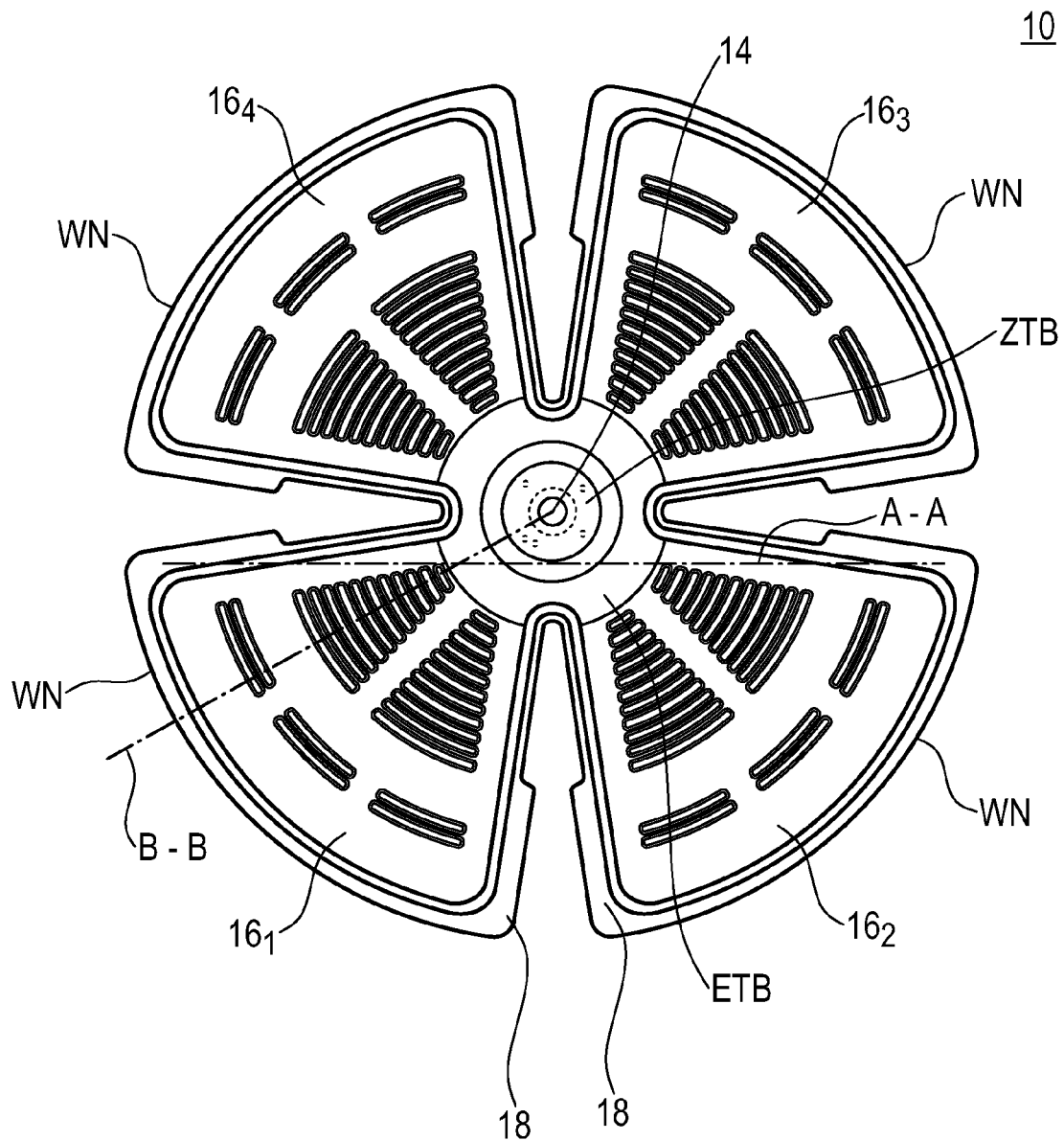
FIG. 4*a* is schematic diagram of a part of the airbag according to the invention of FIG. 1 in the deployed state in a view from above with indicated sectional lines A-A and B-B.
Figure 4B:
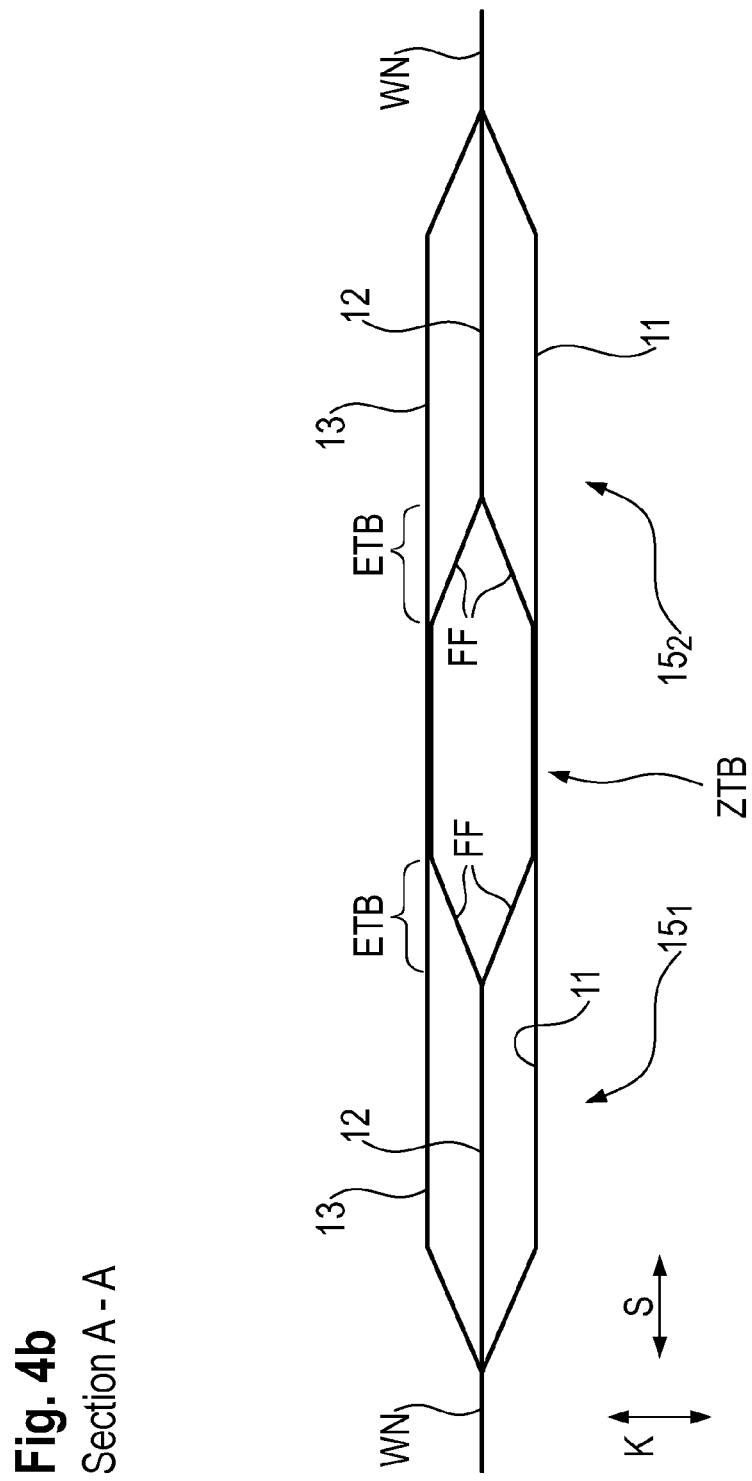
FIG. 4*b* is a schematic diagram of the part of the airbag according to the invention of FIG. 4*a* in the deployed state in a sectional view according to sectional line A-A.
Figure 4C:
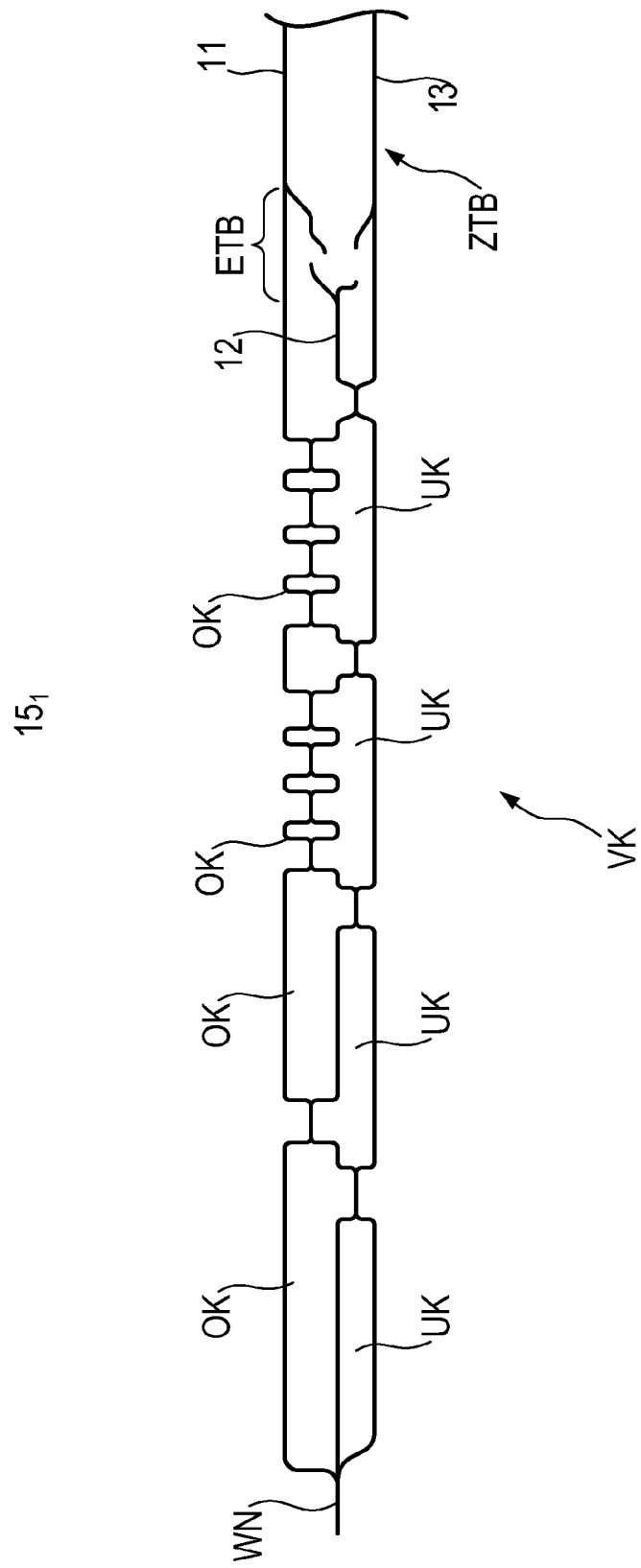
FIG. 4*c* is schematic diagram of the part of the airbag according to the invention of FIG. 4*a* in the deployed state in a sectional view according to sectional line B-B.

FIG. 4a shows, similar to FIG. 3, a schematic representation of a part of the airbag 10 according to the invention of FIG. 1 in the deployed state in a view from above, but with sectional lines A-A and B-B indicated. FIG. 4b shows a schematic representation of the part of the airbag 10 according to the invention of FIG. 4a in the deployed state in a sectional view according to sectional line A-A and FIG. 4c shows a schematic representation of the part of the airbag 10 according to the invention of FIG. 4a in the deployed state in a sectional view according to sectional line B-B.

As can be seen in particular from FIG. 4b), the airbag 10 essentially has a two-layered region, which is formed by the second partial region ZTB, which is explained in more detail below and has the central inflow region 14. Accordingly, the second partial region with the central inflow region 14 is formed by a first, in the illustrated case lower fabric layer 11 and a third, in the illustrated case upper fabric layer 13.

The wing regions $15_1$, $15_2$, $15_3$, $15_4$ extending radially from the second partial region ZTB with the central inflow region 14 (shown in section A-A are $15_1$, $15_2$) each have three fabric layers 11, 12, 13, namely the lower fabric layer 11, the upper fabric layer 13 and a second, in the case shown middle fabric layer 12 arranged between them. In particular, the airbag 10 is designed as said OPW airbag with warp threads running in the warp direction K in FIG. 4b) and weft threads running in the weft direction S in FIG. 4b), which are woven in two woven fabric layers 11 and 13 in the second partial region ZTB with the central inflow region 14 and in three woven fabric layers 11, 12 and 13 in the respective wing regions $15_1$, $15_2$, $15_3$, $15_4$.

As can be seen in particular in FIG. 4b), the warp threads and weft threads are woven together in such a way that the airbag 10, as already mentioned, forms the second partial region ZTB with the central inflow region 14 in two layers and the respective wing regions $15_1$, $15_2$, $15_3$, $15_4$ in three layers.

A change from the respective three-layer wing regions $15_1$, $15_2$, $15_3$, $15_4$ to the two-layer second partial region ZTB with the central inflow region 14 takes place in a first partial region ETB adjacent to the respective wing regions $15_1$, $15_2$, $15_3$, $15_4$, which thus forms a transition region.

In the first partial region ETB, the warp and weft threads of the middle fabric layer 12 emerge from it and float completely between the lower fabric layer 11 and the upper fabric layer 13 (shown as floating warp and weft threads FF in FIG. 4b).

Adjacent to the first partial region ETB is the aforementioned second partial region ZTB, which finally ends in the central inflow region 14.

At the transition from the first partial region ETB to the second, two-ply configured partial region ZTB, the warp and weft threads of the middle fabric layer 12, which were previously floating in the first partial region ETB, enter the upper fabric layer 13 or the lower fabric layer 11.

The second partial region ZTB is therefore configured in two layers, i.e. it consists only of the upper fabric layer 11 and the lower fabric layer 13 and finally forms the central inflow region 14, in which the generator mouth or the connection region in which the generator is accommodated or connected is also located. The lower fabric layer 11 and the upper fabric layer 13 in the second partial region thus have corresponding proportions of the warp and weft threads of the middle fabric layer 12 of the first partial region.

As can be seen in more detail from FIG. 4c), in which the section B-B through the wing region $15_1$ is shown, the three fabric layers 11, 12, 13 are interwoven in the respective wing regions $15_1$, $15_2$, $15_3$, $15_4$ in such a way that stiffening chambers VK extending in the circumferential direction and radially offset relative to one another are formed between the lower fabric layer 11 and the middle fabric layer 12 and the upper fabric layer 13 and the middle fabric layer 12, i.e. in the case shown in FIG. 4c, lower and upper stiffening chambers UK and OK are formed, which cause the wing regions $15_1$, $15_2$, $15_3$, $15_4$ to be curved outwards, at least in portions, during their inflation operation. Due to this arrangement of the stiffening chambers VK, namely the provision of smaller distances between some upper or outer stiffening chambers OK and larger distances between the lower or inner stiffening chambers UK, the curvature of the airbag 10 is achieved outwards, in the case shown in FIG. 4c downwards.

FIGS. 5a and b show schematic representations of the airbag 10 of FIG. 1 according to the invention in perspective views from the side and from above. In this respect, FIG. 5a) shows the airbag 10 in the inflated state without the tensioning element 17, whereas FIG. 5b) shows the airbag 10 in the inflated state with the tensioning element 17 attached.

As can be seen in FIG. 5b, the airbag 10 forms a concave shape in the region of the distal end portions $16_1$, $16_2$, $16_3$, $16_4$ and the flat tensioning element 17 in this case, which is achieved by the fact that the tensioning element 17 is attached to the distal end portions $16_1$, $16_2$, $16_3$, $16_4$ somewhat offset in the radial direction towards the inflow region 14 at the distal end portions $16_1$, $16_2$, $16_3$, $16_4$ and is not attached to the outermost edge of the wing regions $15_1$, $15_2$, $15_3$, $15_4$.

The inflation operation of the OPW airbag according to the invention described above is thus as follows:

When the inflation device in the form of the gas generator is activated, gas flows into the two-layer second partial region with the central inflow region 14, then enters the first partial region ETB, which forms the transition region, and from there into the respective lower and upper stiffening chambers UK, OK of the respective wing regions $15_1$, $15_2$, $15_3$, $15_4$. The airbag 10 unfolds, stretching the tensioning element 17 and finally assuming a bowl shape, as can be seen in FIGS. 2b and 5.

Figure 5:
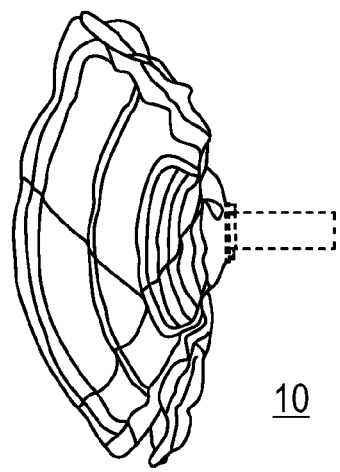
FIG. 5*a-b* are schematic diagrams of the airbag of FIG. 1 according to the invention in perspective views from the side and from above.
Figure 5:
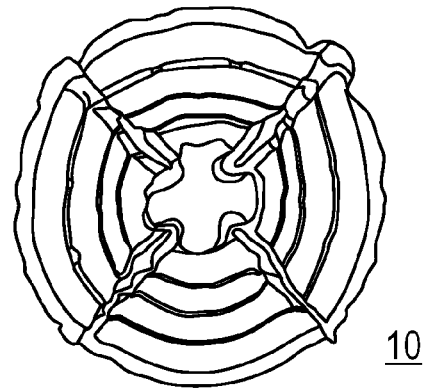
Figure 5:
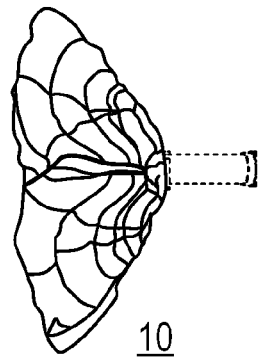
Figure 5:
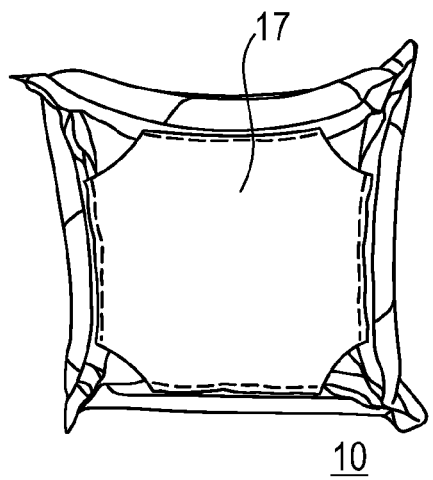

In the case shown in FIG. 5, the tensioning element 17, unlike that of FIG. 2, has a square shape and not a circular shape, resulting in a different shape of the airbag 10 in the inflated state.

The features of the invention which are disclosed in the above description, in the drawings and in the claims may be essential for implementing the invention both individually and in any desired combination.

REFERENCE SIGNS 10 airbag
11 first/lower/outer fabric layer
12 second/middle fabric layer
13 third/upper/inner fabric layer
14 central inflow region (generator mouth or connection region)
$15_1$, first radially extending wing region
$15_2$, second radially extending wing region
$15_3$, third radially extending wing region
$15_4$, fourth radially extending wing region
$16_1$, first distal end portion of the first wing region
$16_2$, second distal end portion of the second wing region 16₃, third distal end portion of the third wing region
16₄ fourth distal end portion of the fourth wing region
17 flat tensioning element, in particular flat fabric piece
18 seam portion
ETB first partial region
ZTB second partial region
FF floating warp and weft threads
VK stiffening chambers
OK upper stiffening chambers
UK lower stiffening chambers
S weft direction
K warp direction
WN woven seam

The invention claimed is:

1. An airbag configured to be set from an uninflated state to an inflated state by an inflation operation to protect an occupant of a vehicle,
wherein the airbag has at least two fabric layers which are connected to one another in such a way that a central inflow region forming a first airbag chamber and at least two wing regions forming respective second airbag chambers extending away from or radially from the inflow region are formed, so that during the inflation operation of the airbag, a gas can first flow into the central inflow region and then from the central inflow region into the respective wing regions,
wherein distal end portions of the at least two wing regions are connected to one another via a flat tensioning element, so that during the inflation operation of the airbag the distal end portions move in a depth direction of the airbag away from the inflow region or move axially away from the central inflow region and in the inflated state of the airbag stretch or radially tension the flat tensioning element in the depth direction away from the inflow region or axially spaced from the central inflow region,
wherein the airbag has three fabric layers at least in the wing regions, namely a first fabric layer, a second fabric layer and a third fabric layer, wherein the second fabric layer is arranged between the first fabric layer and the third fabric layer, wherein the three fabric layers are interwoven with one another in such a way that stiffening chambers (OK, UK) are formed between the first fabric layer and the second fabric layer and the third fabric layer and the second fabric layer, which stiffening chambers (OK; UK) extend in a circumferential direction and are offset radially with respect to one another and cause the wing regions to be curved outwards at least in portions during the inflation operation thereof.

2. The airbag according to claim 1, wherein the fabric layers in the wing regions are linked to one another in such a way that, during the inflation operation of the airbag, their distal end portions stretch or radially tension the flat tensioning element at a distance from the central inflow region in a position of the at least two wing regions which is determined by a stretching force of the flat tensioning element.

3. The airbag according to claim 1, wherein the fabric layers in the wing regions are linked together in such a way that, during the inflation operation of the airbag, the at least two wing regions curve outwards in a radial direction at least in portions and/or in the inflated state of the airbag the at least two wing regions extend axially from the central inflow region and are bent radially outwards at least in portions.

4. The airbag according to claim 1, wherein the airbag is configured as a one-piece woven (OPW) airbag with warp threads and weft threads woven into the woven fabric layers in the central inflow region and the respective wing regions,
wherein the warp threads and weft threads are woven together in such a way that the airbag forms the central inflow region in two layers and the respective wing regions in three layers, wherein in a first partial region (ETB) between a respective wing region and a second partial region which extends towards and finally forms the inflow region, the warp and weft threads of the second fabric layer emerge from the second fabric layer and float completely between the first fabric layer and the third fabric layer and are incorporated in the first fabric layer or in the third fabric layer in the second partial region.

5. The airbag according to claim 1, wherein adjacent wing regions are connected to each other via seam portions in a circumferential direction at least in portions.

6. The airbag according to claim 1, wherein the airbag, in the inflated state, is configured to be circular when viewed in an axial direction, and/or the wing regions, in the inflated state of the airbag, are configured to be in the shape of a segment of a circle when viewed in the axial direction.

7. The airbag according to claim 1, wherein the at least two fabric layers form a circular or star-shaped contour of the airbag when lying on top of each other.

8. The airbag according to claim 1, wherein the airbag in the inflated state has the shape of a rotational paraboloid or elliptical paraboloid or a bowl.

9. The airbag according to claim 1, wherein the airbag in the inflated state is configured such that the inflow region, the wing regions and the flat tensioning element surround, at least in portions, a space outside the inflated airbag.

10. The airbag according to claim 1, wherein the airbag forms a flat or concave shape in a region of the distal end portions and the flat tensioning element.

11. An airbag configured to be set from an uninflated state to an inflated state by an inflation operation to protect an occupant of a vehicle,
wherein the airbag has at least two fabric layers which are connected to one another in such a way that a central inflow region forming a first airbag chamber and at least two wing regions forming respective second airbag chambers extending away from or radially from the inflow region are formed, so that during the inflation operation of the airbag, a gas can first flow into the central inflow region and then from the central inflow region into the respective wing regions,
wherein distal end portions of the at least two wing regions are connected to one another via a flat tensioning element, so that during the inflation operation of the airbag the distal end portions move in a depth direction of the airbag away from the inflow region or move axially away from the central inflow region and in the inflated state of the airbag stretch or radially tension the flat tensioning element in the depth direction away from the inflow region or axially spaced from the central inflow region,
wherein the airbag is configured as a one-piece woven (OPW) airbag with warp threads and weft threads woven into the woven fabric layers in the central inflow region and the respective wing regions, and
wherein the warp threads and weft threads are woven together in such a way that the airbag forms the central inflow region in two layers and the respective wing regions in three layers, wherein in a first partial region (ETB) between a respective wing region and a second partial region which extends towards and finally forms the inflow region, the warp and weft threads of the second fabric layer emerge from the second fabric layer and float completely between the first fabric layer and the third fabric layer and are incorporated in the first fabric layer or in the third fabric layer in the second partial region.

* * * * *